United States Patent [19]
Konno et al.

[11] Patent Number: 5,619,625
[45] Date of Patent: Apr. 8, 1997

[54] METHOD FOR INTERPOLATING SMOOTH FREE-FORM SURFACES INTO CURVE MESH INCLUDING COMPOSITE CURVES

[75] Inventors: Kouichi Konno, Tokorozawa; Hiroaki Chiyokura, Tokyo, both of Japan

[73] Assignee: Ricoh Company, Ltd., Tokyo, Japan

[21] Appl. No.: 250,451

[22] Filed: May 27, 1994

[30] Foreign Application Priority Data

May 28, 1993 [JP] Japan ................................. 5-151526

[51] Int. Cl.⁶ ............................................. G06T 17/20
[52] U.S. Cl. .................................... 395/119; 395/141
[58] Field of Search .................. 395/118–120, 141–142

[56] References Cited

U.S. PATENT DOCUMENTS

| | | | |
|---|---|---|---|
| 4,855,926 | 8/1989 | Seki et al. | 364/474.29 |
| 5,179,644 | 1/1993 | Chiyokura et al. | 395/141 |
| 5,345,546 | 9/1994 | Harada et al. | 395/142 |
| 5,390,292 | 2/1995 | Takamura et al. | 395/120 |
| 5,402,531 | 3/1995 | Tamura | 395/120 |
| 5,410,489 | 4/1995 | Seli et al. | 364/474.29 |
| 5,414,802 | 5/1995 | Takamura | 395/119 |

OTHER PUBLICATIONS

Chiyokura, Hiroaki, et al, "Design of Solids with Free–Form Surfaces," *Computer Graphics*, vol. 17, No. 3, Jul. 1983, pp. 289–298.

R.E. Barnhill, J. H. Brown, and I. M. Klucewicz, A New Twist in Computer Aided Geometric Design, Computer Graphics and Image Processing 8, pp. 78–91 (1978).

Hiroaki Chiyokura, Teiji Takamura, Koichi Konno, and Tsuyoshi Harada, G¹ Surface Interpolation over Irregular Meshes with Rational Curves, NURBS for Curve and Surface Design, Society for Industrial and Applied Mathematics, Editor Gerald Farin, Chapter 2, pp. 15–34, (1991).

Kouichi Konno, Teiji Takamura, and Hiroaki Chiyokura, A New Control Method for Free–Form Surfaces with Tangent Continuity and its Applications, Springer–Verlag, Tokyo (1991).

Barnhill, et al., A New Twist To Computer Aided Geometric Design, *Computer Graphics and Image Processing*, 8, pp. 78–91 (1978).

Chiyokura, et al., G¹ Surface Interpolation Over Irregular Meshes with Rational Curves, NURBS for Curve and Surface Design, *Society for Industrial and Applied Mathematics*, Editor Gerald Farin, Chapter 2, pp. 15–34 (1991).

Konno, et al., A New Control Method for Free–Form Surfaces with Tangent Continuity and its Applications, *Springer–Verlag*, Tokyo (1991).

Foley, et al., "Fundamentals of Interactive Computer Graphics", pp. 514–515 (1982).

*Primary Examiner*—Mark K. Zimmerman
*Assistant Examiner*—Rudolph Buchel
*Attorney, Agent, or Firm*—Woodcock Washburn Kurtz Mackiewicz & Norris

[57] ABSTRACT

A method of generating a free-form surface includes calculating cross boundary derivatives on all the boundary curves forming a face, and storing the results in a memory device (STEP 1), determining whether the cross boundary derivatives calculated at STEP 1 are all polynomials or not, and if there is a rational function, go to STEP 3, if they are all polynomials, go to STEP 4 (STEP 2), creating the control points of a rational surface by using the cross boundary derivatives (STEP 3), and creating the control points of a polynomial surface by using the cross boundary derivatives (STEP 4).

14 Claims, 14 Drawing Sheets

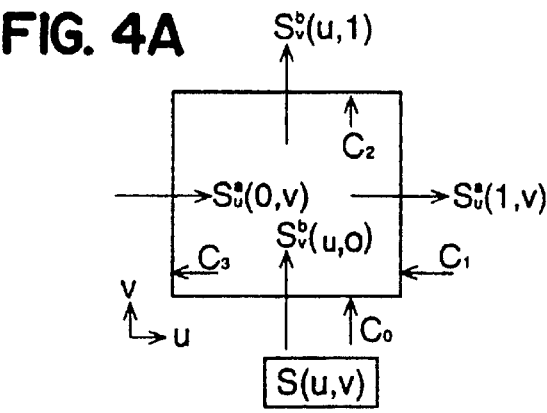
FIG. 4A
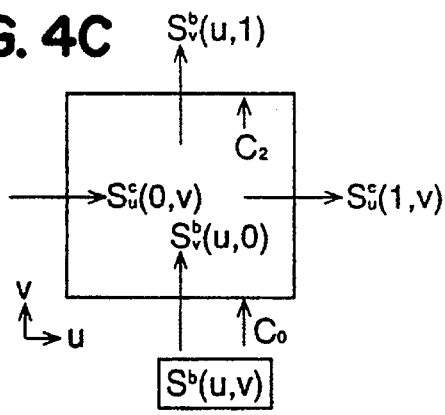
FIG. 4C
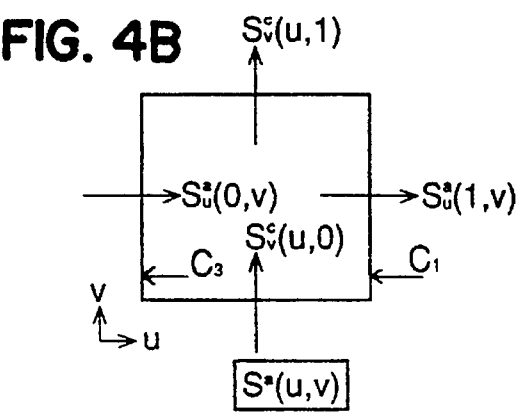
FIG. 4B
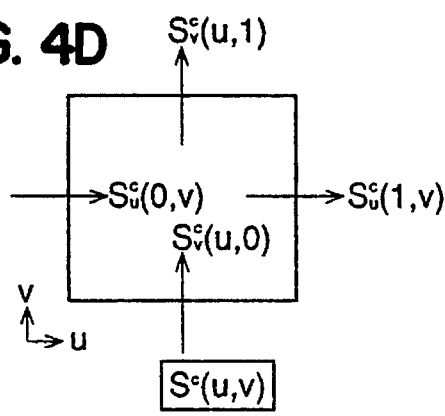
FIG. 4D
FIG. 5
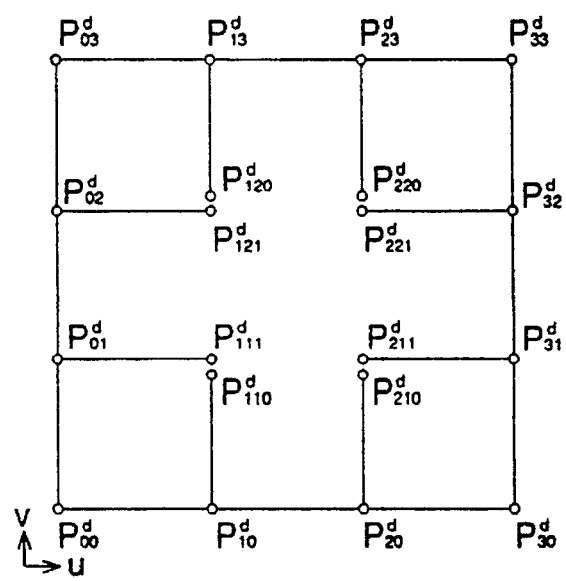

METHOD FOR INTERPOLATING SMOOTH FREE-FORM SURFACES INTO CURVE MESH INCLUDING COMPOSITE CURVES

BACKGROUND OF THE INVENTION

1. Field of the Invention

This invention relates generally to a method for generating free-form surfaces, and, particularly, relates to a free-form surface generation method used in a 3D object shape processor. This invention can be applied to a free-form surface generation for a 3D shape which is defined by curve mesh.

2. Description of the Prior Art

In shape design by the use of Computer Aided Design (CAD) systems, one of the most important requirements is the capability to easily design a shape of complex free-form surfaces. When designing a shape of free-form surfaces, a designer may wish to have a CAD system having functions, for defining free-form surfaces, which are suitable for the design method to be used, are easy to use, and can be manipulated intuitively. Generally, a straight forward method of defining free-form surfaces may be to input the data of characteristic lines which define cross section lines and surface boundaries. In using those methods, the designer first defines curve mesh representing surface boundaries, then, interpolate free-form surfaces into the curve mesh. Unfortunately, the generated curve mesh can only roughly represent the intended shape. Nevertheless, when the curve mesh is interpolated, the resulting free-form surfaces must have the same shape as intended by the designer.

In general, curve mesh are comprised of various types of curves like the Bezier curve and the NURBS (nonuniform rational B-splines) curve. Also, irregular curve mesh, which has the faces of non-quadrilateral shape like a triangle and pentagon, may appear, depending on the shapes being designed. It is required that such curve mesh as comprised of various types of curves and/or as including some irregular faces be also interpolated by the free-form surfaces having the shape intended by the designer.

The Gregory patch and the rational boundary Gregory patch can be named as a typical representation of the free-form surface for smoothly interpolating irregular curve mesh. By the use of those free-form surface representations, irregular curve mesh having triangular or pentagonal faces can be interpolated with $G^1$ continuity. However, since boundary curves can only be represented by the Bezier curve or a rational Bezier curve in those free-form surface representations, such composite curves as the NURBS curve cannot be used for boundaries.

Although the Gregory patch and the rational boundary Gregory patch can interpolate irregular curve mesh with $G^1$ continuity, in the case of interpolating a non-quadrilateral face, interior curves for dividing the face are generated during the process of interpolation. These interior curves divide the non-quadrilateral face into more than one quadrilateral faces, which are then interpolated with the Gregory patch or the rational boundary Gregory patch. If each boundary curve of a quadrilateral face cannot be represented by the Bezier curve or the rational Bezier curve, this face is regarded as non-quadrilateral rather than quadrilateral, and interior curves are generated in the process of interpolation.

Composite curves appear, in particular, with cross sections produced by cutting free-form surfaces and with curve mesh including boundary curves for offset surfaces. Faces of such mesh are interpolated by a plurality of the Gregory patches, even if those faces are topologically a quadrilateral. Generation of interior curves is based on the shape of boundary curves, and a distortion may occur on the generated surfaces, depending on the shape of the boundary curves. In such a case, the resulting surface does not have the shape intended by the designer. In general, it is difficult to control the shape of interior curves by changing the shape of boundary curves.

On the other hand, for the NURBS surface, the existence of composite curves in curve mesh does not matter since boundary curves are represented by the NURBS curves. For the NURBS surface, however, it is difficult to interpolate irregular curve mesh smoothly. Furthermore, the continuity between surface patches depends on the knot vectors and control points. Thus, it is generally difficult to represent one surface by a set of patches with $C^n$ continuity.

As described above, there are prior arts for smoothly interpolating irregular curve mesh which does not have composite curves, and for smoothly interpolating regular curve mesh which has composite curves. It is difficult with prior arts, however, to interpolate free-form surfaces without any distortion into irregular curve mesh which has composite curves. Thus, there is a need for interpolating without any distortion irregular curve mesh which has composite curves.

SUMMARY OF THE INVENTION

Accordingly, it is a general object of the present invention to provide a free-form surface generation method which satisfies the need described above.

Another and more specific object of the present invention is to provide a free-form surface generation method which smoothly joins two surface patches sharing a common boundary curve, including a composite curve, by the use of an interpolation method which applies the general boundary Gregory patch, and which generates a free-form surface which is joined smoothly to all the adjacent surfaces by creating the interior control points for smoothly joining the free-form surface with the adjacent surfaces along all the boundary curves and by generating the general boundary Gregory patch based on those interior control points.

Yet another object of the present invention is to provide a free-form surface generation method which smoothly joins the interpolated general boundary Gregory patch to an adjacent interpolated Gregory or rational boundary Gregory patch when the boundary curve is the Bezier curve or the rational Bezier curve, by utilizing the feature of the general boundary Gregory patch which can have any type of curve as a boundary curve and can define a boundary curve and a cross boundary derivative independently, and which allows easier defining of shape by using fewer number of curves for representing shape for which complex curve mesh would have be applied in the prior arts, by utilizing the feature of the general boundary Gregory patch which can have as a boundary curve a composite curve, which can be expressed by piecewise polynomials and can be regarded as a sequence of the Bezier curve and the rational Bezier curve, thereby allowing the integration of a plurality of boundary curves to generate a larger single face surrounded by the integrated composite curves.

A further object of the present invention is to provide a free-form surface generation method which interpolates only one free-form surface into mesh and thereby generates no distortion even in the case that a plurality of patches would be otherwise needed for interpolation and, thus, distortion would be generated depending on the shape of curves even for a quadrilateral face when having a composite curve as a boundary, wherein composite curves would appear due to the cutting of free-form surfaces or offset, and which guarantees $C^n$ continuity on a surface patch within the boundary curves by utilizing the fact that the general boundary Gregory patch can be represented by only one polynomial.

Briefly, a free-form surface generation method according to the present invention has following advantageous features; (1) joining smoothly two adjacent free-form surfaces sharing a boundary curve of any type (e.g., composite curve) by creating interior control points determined by the condition of connection on the boundary, which is derived from the condition of continuity on the boundary, which is determined by the boundary curve and other curves connected thereto; (2) generating free-form surfaces smoothly connected to each other by creating the control points for all the boundary curves and combining those control points; (3) generating a free-form surface in (2) which is smoothly joined to adjacent Gregory patches; (4) generating a free-form surface in (2) which is smoothly joined to adjacent rational boundary Gregory patches; (5) representing complex curve mesh by as few curves as possible in (2); (6) interpolating only one, if possible, surface into curve mesh in (2); and (7) keeping $C^n$ continuity on a surface within the boundary curves.

Other objects and further features of the present invention will be apparent from the following detailed description when read in conjunction with the accompanying drawings.

BRIEF DESCRIPTION OF THE DRAWINGS

FIG. 4 is a diagram showing the general boundary Gregory patch according to the present invention;

FIG. 5 is a diagram showing the control points for the general boundary Gregory patch according to the present invention for which cross boundary derivatives are polynomials;

DESCRIPTION OF THE PREFERRED EMBODIMENTS

Figure 1:
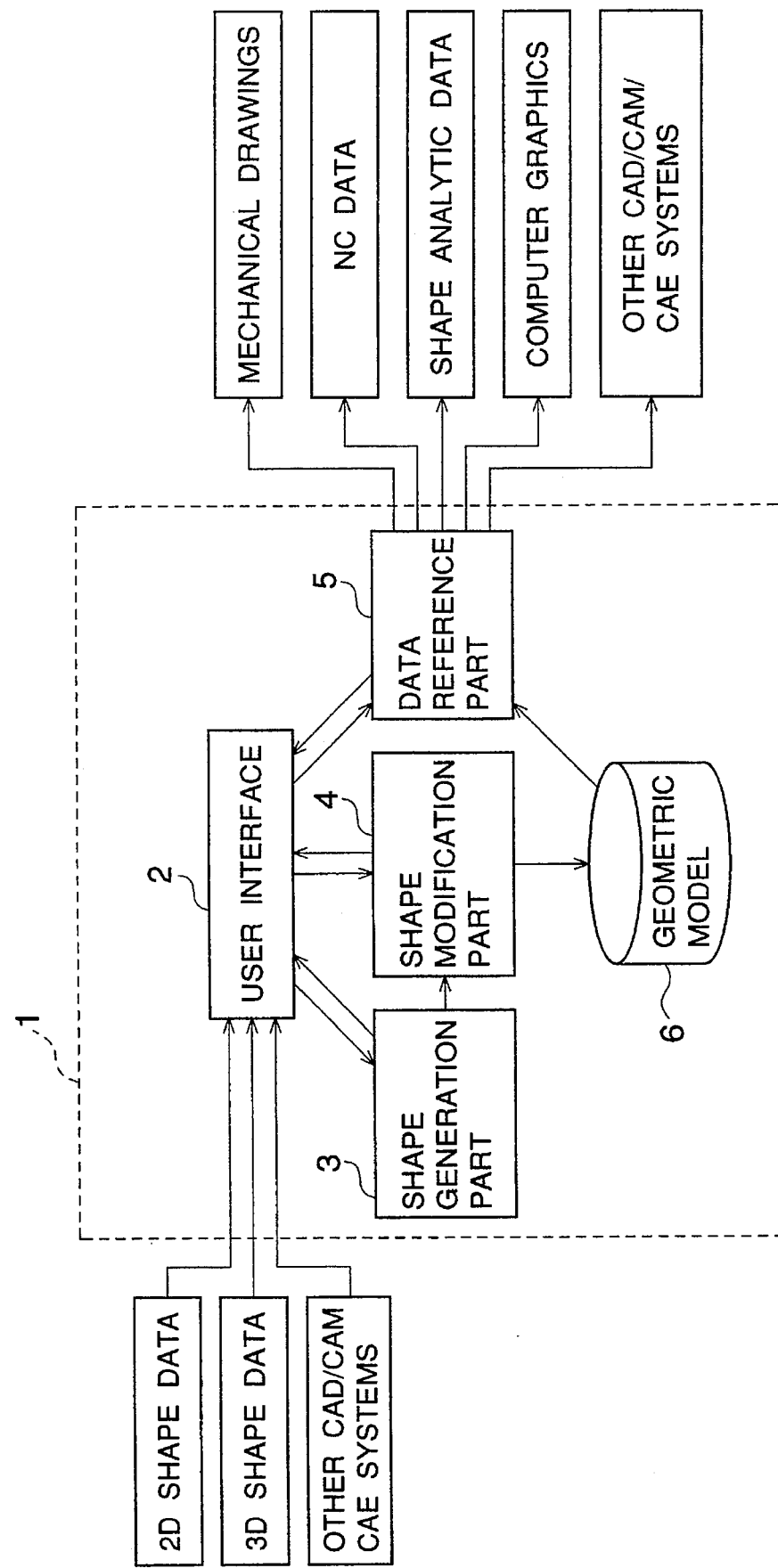
FIG. 1 is a CAD system according to the present invention.

FIG. 1 shows a CAD system 1 according to the present invention. The CAD system 1 comprises a user interface 2, a shape generation part 3, a shape modification part 4, a data reference part 5, and a geometric model 6.

In FIG. 1, the user interface part 2 receives 2D shape data or 3D shape data from the user or other CAD/CAM (Computer Aided Manufacturing)/CAE (Computer Aided Engineering) systems. With regard to the present invention, curve mesh data is received by the user interface 2, and is sent to the shape generation part 3, which interpolates the curve mesh and generates free-form surfaces. The generated surfaces are sent to the data modification part 4, where the surfaces may be modified by the means instructed by the user interface 2, and the resulting surfaces are stored in geometric model 6. The data reference part 5 receives instructions from the user interface 2, accesses data stored in the geometric model 6, and provides those data for mechanical drawings, NC data, shape analytic data, computer graphics, or other CAD/CAM/CAE systems.

As described above, free-from surface generation according to the present invention is carried out by the shape generation part 3 of the CAD system 1 shown in FIG. 1.

Figure 2:
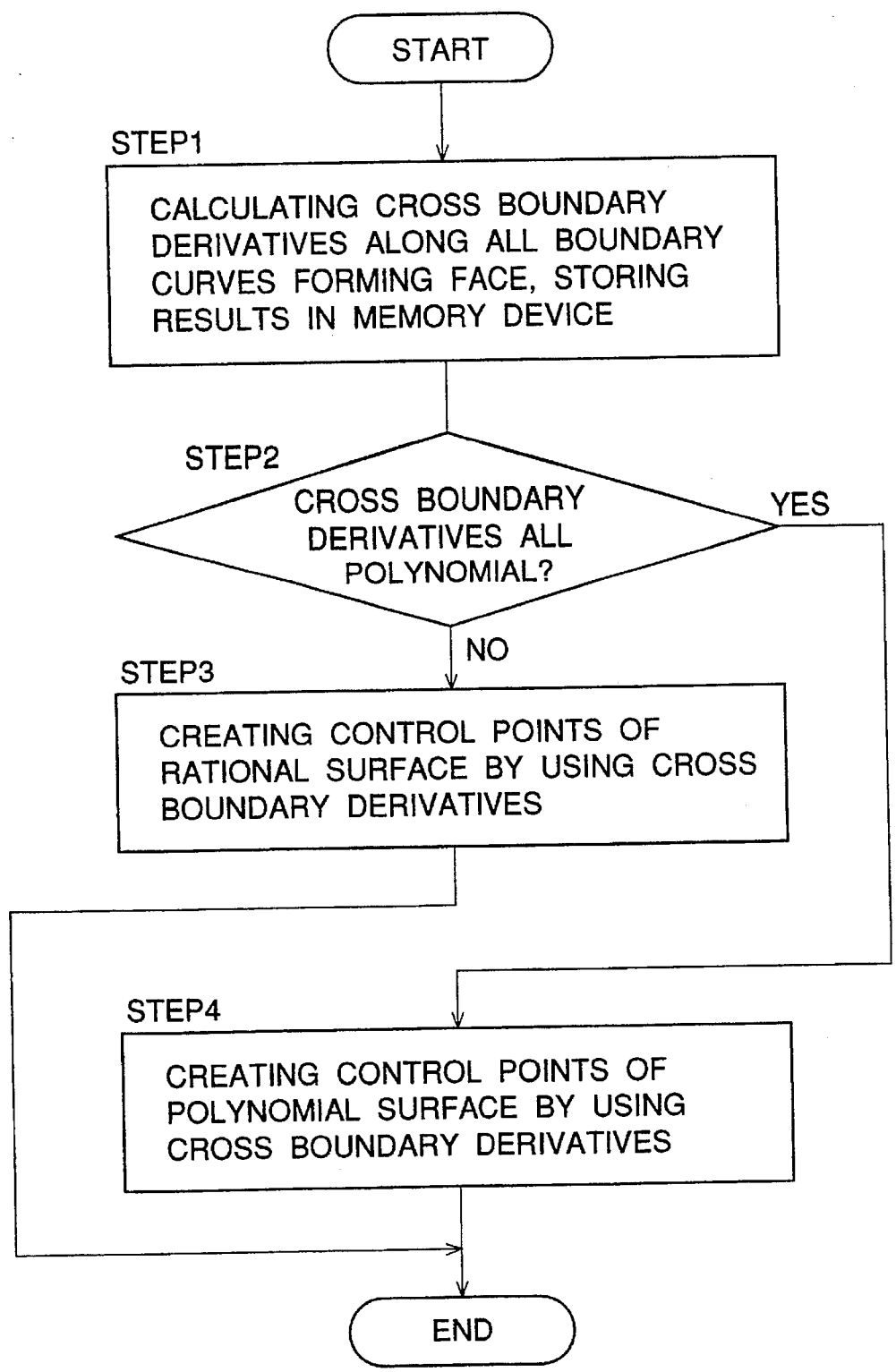
FIG. 2 is a flow chart of the process of generating the general boundary Gregory patch according to the present invention.

FIG. 2 shows a flow chart of the process of generating the general boundary Gregory (GBG) patch for describing the preferred embodiment of a free-form surface generation method according to the present invention.

The following is the description of each step of the process shown in FIG. 2 of interpolating into curve mesh a general boundary Gregory patch smoothly joined to adjacent patches.

STEP 1: calculating cross boundary derivatives along all the boundary curves forming a face, and storing the results in a memory device.

STEP 2: determining whether the cross boundary derivatives calculated at STEP 1 are all polynomials or not, and if there is at least one rational function, go to STEP 3, if they are all polynomials, go to STEP 4.

STEP 3: creating the control points of a rational surface by using the cross boundary derivatives.

STEP 4: creating the control points of a polynomial surface by using the cross boundary derivatives.

Figure 3:
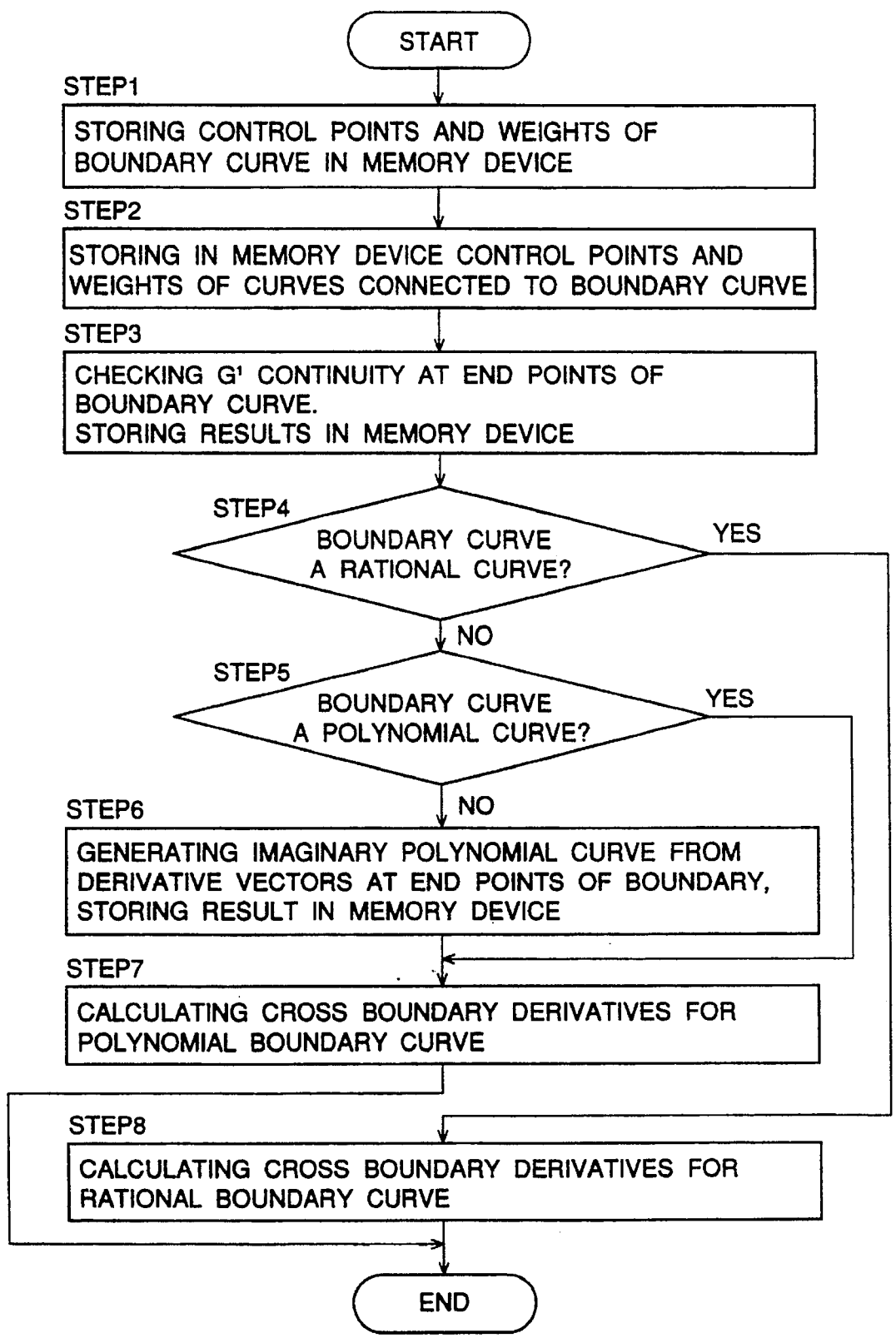
FIG. 3 is a flow chart of the process of calculating the cross boundary derivative according to the present invention.

FIG. 3 shows a flow chart of the process of calculating cross boundary derivatives along a single boundary curve for smoothly joining the two surfaces sharing this boundary curve. This process is part of above STEP 1, and each step of this process is described in the following.

STEP 1: storing the control points and weights of the boundary curve in the memory device.

STEP 2: storing in the memory device the control points and weights of the curves which are connected to the end points of the boundary curve and which partly form the faces sharing the boundary curve.

STEP 3: checking $G^1$ continuity at the end points of the boundary curve, and storing the results in the memory device.

STEP 4: determining whether the boundary curve is a rational curve or not, and if it is, go to STEP 8.

STEP 5: determining whether the boundary curve is a polynomial curve or not, and if it is, go to STEP 7, if it is a composite curve, go to STEP 6.

STEP 6: calculating the derivative vectors at the end points by using the control points and weights of the boundary curve stored at STEP 1, generating a imaginary polynomial curve, and storing the results in the memory device.

STEP 7: calculating the cross boundary derivatives by using the control points of either the boundary curve stored at STEP 1 and STEP 2 or the curve generated at STEP 6 and by using the condition of continuity determined at STEP 3.

STEP 8: calculating the cross boundary derivatives by using the control points and weights of the boundary curve stored at STEP 1 and STEP 2 and by using the condition of continuity determined at STEP 3.

The following is the description of the process of smoothly joining two surfaces and the process of interpolating into a curve mesh a general boundary Gregory patch joined smoothly to adjacent surfaces.

By using four boundary curves, $C_i$ (i=0, ... ,3), and using a CBD (Cross Boundary Derivative), $\partial S^a(0, v)/\partial u$, $\partial S^a(1, v)/\partial u$, $\partial S^b(u,0)/\partial v$, and $\partial S^b(u,1)/\partial v$ along each boundary, the general boundary Gregory patch $S(u,v)$ is defined as $$S(u,v) = S^a(u,v) + S^b(u,v) - S^c(u,v) \quad (1)$$

In the following, $S_u = \partial S/\partial u$, $S_v = \partial S/\partial v$. $S^a(u,v)$ is a surface which is cubic-blended by the two opposite boundary curves, $C_3$ and $C_1$, and the corresponding CBD, $S_u^a(0,v)$ and $S_u^a(1,v)$. $S^b(u,v)$ is a surface which is cubic-blended by the two opposite boundary curves, $C_0$ and $C_2$, and the corresponding CBD, $S_v^b(u,0)$ and $S_v^b(u,1)$. $S^c$ is represented by a bicubic patch (FIG. 4), and is a surface which represents redundant part dually contributed by both $S^a$ and $S^b$, and should be removed by subtraction. Thus, surface $S^a(u,v)$ and $S^b(u,v)$ are represented as follows.

$$S^a(u,v) = \sum_{i=0}^{3} B_i^3(u) P_i^a(v) \quad (2)$$

$$S^b(u,v) = \sum_{i=0}^{3} B_i^3(u) P_i^b(v) \quad (3)$$

Where, $B_i^3(u)$ is the Bernstein polynomial, $$B_i^n(t) = \binom{n}{i} t^i (1-t)^{n-i}$$

In equation (2) and (3), t is u and v, respectively, and n is equal to 3.

$P^a$ and $P^b$ can have two different representations, depending on whether CBDs are polynomials or rational functions. If the boundary curves are either composite curves or Bezier curves, CBD are represented by polynomials, and if they are rational Bezier curves, CBD are represented by rational functions. By representing CBD in such a manner, a smooth connection can be created between two patches, such as two general boundary Gregory patches, a general boundary Gregory patch and a Gregory patch, or a general boundary Gregory patch and a rational boundary Gregory patch. A detailed description of the connection will be discussed later. As seen in FIG. 4, there is a dependency between surface $S^c$, $P^a$, and $P^b$, i.e., $S_u^c$ is a surface $S^b$ differentiated by u, and $S_v^c$ is a surface $S^a$ differentiated by v. Accordingly, if both $P^a$ and $P^b$ are represented by polynomials, $S^c$ becomes a polynomial also. If either $P^a$ or $P^b$ is represented by rational functions, $S^c$ becomes a rational function. Also, since $S_v^c$ and $S_u^c$ are restricted by the two surfaces, CBD of $S^c$ must be defined by either u or v independently. Thus, the Gregory patch or the rational boundary Gregory patch is suitable for the representation of $S^c$. By representing $S^c$ by the Gregory patch or the rational boundary Gregory patch, $S_u^a$ and $S_v^a$ can be calculated from the control points of $S^c$.

When CBDs are represented by polynomials, $P^a$, $P^b$, and $S^c$ can be represented as follows.

$$P_0^a(v) = C_3(v)$$

$$P_1^a(v) = C_3(v) + \left( \sum_{j=0}^{3} B_j^3(v) P_{1j1}^d - \sum_{j=0}^{3} B_j^3(v) P_{0j1}^d \right)$$

$$P_2^a(v) = C_1(v) + \left( \sum_{j=0}^{3} B_j^3(v) P_{3j1}^d - \sum_{j=0}^{3} B_j^3(v) P_{2j1}^d \right)$$

$$P_3^a(v) = C_1(v)$$
$$P_0^b(u) = C_0(u)$$

$$P_1^b(u) = C_0(u) + \left( \sum_{i=0}^{3} B_i^3(u) P_{i10}^d - \sum_{i=0}^{3} B_i^3(u) P_{i00}^d \right)$$

$$P_2^b(u) = C_2(u) + \left( \sum_{i=0}^{3} B_i^3(u) P_{i30}^d - \sum_{i=0}^{3} B_i^3(u) P_{i20}^d \right)$$

$$P_3^b(u) = C_2(u)$$

where $P^d$ are the control points of $S^c$ shown in FIG. 5, and $P_{ij}^d = P_{ij0}^d = P_{ij1}^d$ (ij≠11, 12, 21, 22).

Differentiation of equation (2) and (3) gives, $$\partial S^a(0,v)/\partial u = \sum_{j=0}^{3} B_j^3(v) P_{1j1}^d - \sum_{j=0}^{3} B_j^3(v) P_{0j1}^d \quad (4)$$

$$\partial S^b(u,0)/\partial v = \sum_{j=0}^{3} B_j^3(u) P_{i10}^d - \sum_{j=0}^{3} B_j^3(u) P_{i00}^d \quad (5)$$

It can be understood that the CBD functions can be defined by either the u parameter or v parameter independently. Thus, the general boundary Gregory patch can interpolate irregular curve mesh as smoothly as the Gregory patch can do. In addition to that, CBD is not dependent on the boundary curve.

Surface $S^c$ is a redundant part dually contributed by $S^a$ and $S^b$, and is represented as follows.

$$S^c(u,v) = \sum_{i=0}^{3} \sum_{j=0}^{3} B_i^3(u) B_j^3(v) P_{ij}^c(u,v) \quad (6)$$

$P_{ij}^c(u,v) = P_{ij}^d (i,j \neq 1,2)$ $P_{11}^c(u,v) = (u P_{111}^d + v P_{110}^d)/(u + v)$ $P_{12}^c(u,v) = [u P_{121}^d + (1 - v) P_{120}^d]/[u + (1 - v)]$ $P_{21}^c(u,v) = [(1 - u) P_{211}^d + v P_{210}^d]/[(1 - u) + v]$ $P_{22}^c(u,v) = [(1 - u) P_{221}^d + (1 - v) P_{220}^d]/[(1 - u) + (1 - v)]$ where $P^c$ is a function of two variables u and v.

Equation (6) is the same representation as that of the Gregory patch, but the equations of the control points, $P_{ij}^c$ (ij=11, 12, 21, 22), are different from those of the Gregory patch.

From the above description, it can be understood that when CBDs are polynomials, the general boundary Gregory patch can be represented by the representations of the four boundary curves and the Gregory patch.

When CBDs are represented by rational functions, $P^a$, $P^b$, and $S^c$ can be represented as follows.

Figure 6:
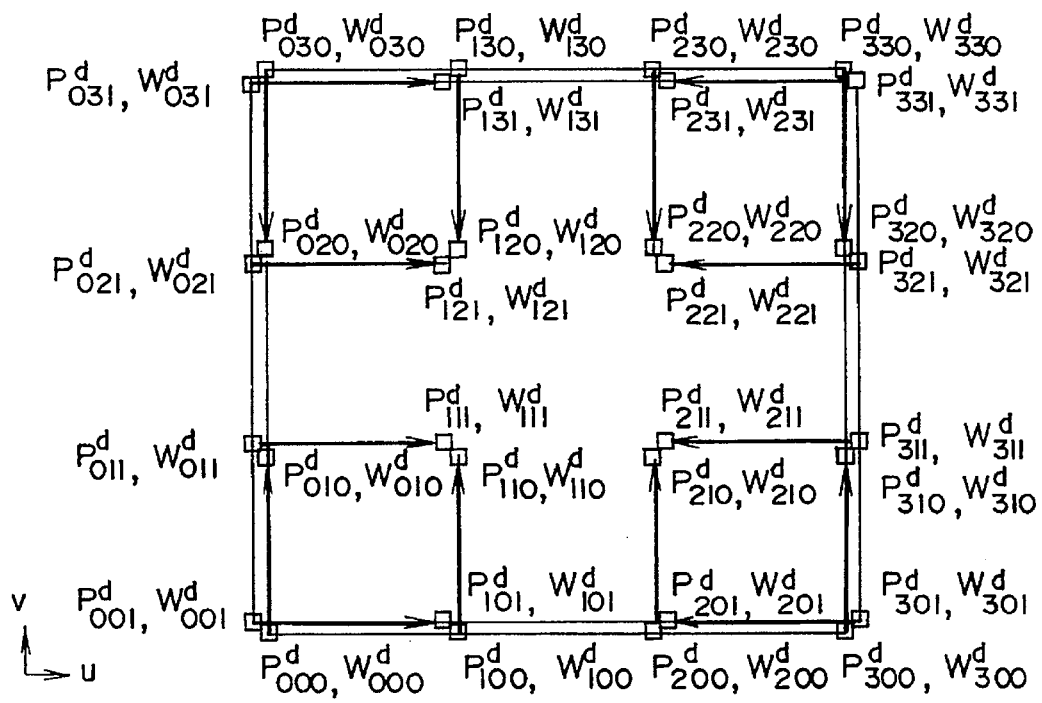
FIG. 6 is a diagram showing the control points for the general boundary Gregory patch according to the present invention for which cross boundary derivatives are rational functions.

$P_0^a(v) = C_3(v)$ $P_1^a(v) = C_3(v) + \left( \sum_{j=0}^{3} B_j^3(v) w_{1j1}^d P_{1j1}^d / \sum_{j=0}^{3} B_j^3(v) w_{1j1}^d - \right.$ $\left. \sum_{j=0}^{3} B_j^3(v) w_{0j1}^d P_{0j1}^d / \sum_{j=0}^{3} B_j^3(v) w_{0j1}^d \right)$ $P_2^a(v) = C_1(v) + \left( \sum_{j=0}^{3} B_j^3(v) w_{3j1}^d P_{3j1}^d / \sum_{j=0}^{3} B_j^3(v) w_{3j1}^d - \right.$ $\left. \sum_{j=0}^{3} B_j^3(v) w_{2j1}^d P_{2j1}^d / \sum_{j=0}^{3} B_j^2(v) w_{2j1}^d \right)$ $P_3^a(v) = C_1(v)$
$P_0^b(u) = C_0(u)$ $P_1^b(u) = C_0(u) + \left( \sum_{i=0}^{3} B_i^3(u) w_{i10}^d P_{i10}^d / \sum_{i=0}^{3} B_i^3(u) w_{i10}^d - \right.$ $\left. \sum_{i=0}^{3} B_i^3(u) w_{i00}^d P_{i00}^d / \sum_{i=0}^{3} B_i^3(u) w_{i00}^d \right)$ $P_2^b(u) = C_2(u) + \left( \sum_{i=0}^{3} B_i^3(u) w_{i30}^d P_{i30}^d / \sum_{i=0}^{3} B_i^3(u) w_{i30}^d - \right.$ $\left. \sum_{i=0}^{3} B_i^3(u) w_{i20}^d P_{i20}^d / \sum_{i=0}^{3} B_i^3(u) w_{i20}^d \right)$ Where $P^d$ and $W^d$ are the control points and the weights of $S^c$, respectively, and are arranged as shown in FIG. 6. Differentiation of equation (2) and (3) gives, $\partial S^a(0,v)/\partial u = \left( \sum_{j=0}^{3} B_j^3(v) w_{1j1}^d P_{1j1}^d / \sum_{j=0}^{3} B_j^3(v) w_{1j1}^d - \right. \quad (7)$ $\left. \sum_{j=0}^{3} B_j^3(v) w_{0j1}^d P_{0j1}^d / \sum_{j=0}^{3} B_j^3(v) w_{0j1}^d \right)$ $\partial S^b(u,0)/\partial v = \left( \sum_{i=0}^{3} B_i^3(u) w_{i10}^d P_{i10}^d / \sum_{i=0}^{3} B_i^3(u) w_{i10}^d - \right. \quad (8)$ $\left. \sum_{i=0}^{3} B_i^3(u) w_{i00}^d P_{i00}^d / \sum_{i=0}^{3} B_i^3(u) w_{i00}^d \right)$ It can be understood that the CBD function can be defined by either the u parameter or v parameter independently. Thus, the general boundary Gregory patch can interpolate irregular curve mesh as smoothly as the Gregory patch can do. In addition to that, CBD is not dependent on the boundary curve.

Surface $S^c$ is a redundant part dually contributed by $S^a$ and $S^b$, and is represented as follows.

$$S^c(u,v) = \sum_{i=0}^{3} \sum_{j=0}^{3} B_i^3(u) B_j^3(v) P_{ij}^c(u,v) / \sum_{i=0}^{3} \sum_{j=0}^{3} B_i^3(u) B_j^3(v) w_{ij}^c(u,v) \quad (9)$$

for $i = 0,1$ and $j = 0,1$ $P_{ij}^c(u,v) = (u^2 w_{ij1}^d P_{ij1}^d + v^2 w_{ij0}^d P_{ij0}^d)/(u^2 + v^2)$ $w_{ij}^c(u,v) = (u^2 w_{ij1}^d + v^2 w_{ij0}^d)/(u^2 + v^2)$ for $i = 0,1$ and $j = 2,3$ $P_{ij}^c(u,v) = [u^2 w_{ij1}^d P_{ij1}^d + (1 - v)^2 w_{ij0}^d P_{ij0}^d]/[u^2 + (1 - v)^2]$ $w_{ij}^c(u,v) = [u^2 w_{ij1}^d + (1 - v)^2 w_{ij0}^d]/[u^2 + (1 - v)^2]$ for $i = 2,3$ and $j = 0,1$ $P_{ij}^c(u,v) = [(1 - u)^2 w_{ij1}^d P_{ij1}^d + v^2 w_{ij0}^d P_{ij0}^d]/[(1 - u)^2 + v^2]$ $w_{ij}^c(u,v) = [(1 - u)^2 w_{ij1}^d + v^2 w_{ij0}^d]/[(1 - u)^2 + v^2]$ for $i = 2,3$ and $j = 2,3$ $P_{ij}^c(u,v) = [(1 - u)^2 w_{ij1}^d P_{ij1}^d + (1 - v)^2 w_{ij0}^d P_{ij0}^d]/[(1 - u)^2 + (1 - v)^2]$ $w_{ij}^c(u,v) = [(1 - u)^2 w_{ij1}^d + (1 - v)^2 w_{ij0}^d]/[(1 - u)^2 + (1 - v)^2]$ Equation (9) is the same representation as that of the rational boundary Gregory patch, but the equations of the control points, $P_{ij}^c$, are different from those of the rational boundary Gregory patch.

From the above description, it can be understood that when CBDs are rational, the general boundary Gregory patch can be represented by the representations of the four boundary curves and the rational boundary Gregory patch.

In such a manner as described above, the general boundary Gregory patch can be represented in two different ways, depending on whether $S^c(u,v)$ is a polynomial or a rational function.

The following are some of the features of the general boundary Gregory patch.

1. The boundary curve and CBD can be defined independently. Thus, the representation of a surface is independent of the type of the boundary curves, and, for example, composite curves like the NURBS curve can be handled. Also, a topologically quadrilateral face is represented by one general boundary Gregory patch, and, thus, distortion does not occur.

2. Any polynomials can be used for the representation of the redundant part, $S^c(u,v)$. In the present invention, the Gregory patch or the rational boundary Gregory patch is used and can smoothly interpolate irregular curve mesh.

3. If the four boundary curves are represented by the cubic Bezier curve and $S^c$ is a Gregory patch, a general boundary Gregory patch becomes a Gregory patch. If the four boundary curves are represented by the cubic rational Bezier curve and $S^c$ is a rational boundary Gregory patch, a general boundary Gregory patch becomes a rational boundary Gregory patch.

4. By substituting the expression of either the Gregory patch or the rational boundary Gregory patch into $S^c$, a general boundary Gregory patch, a Gregory patch, and a rational boundary Gregory patch can be joined smoothly.

5. A surface within the boundary curves has $C^n$ continuity, because the general boundary Gregory patch is represented by only one polynomial.

A method of joining a Gregory patch with a general boundary Gregory patch, joining a rational boundary Gregory patch with a general boundary Gregory patch, or joining two general boundary Gregory patches together is described below.

In order to join two surfaces $S^1$ and $S^2$ with $G^1$ continuity, equation (10) must be satisfied.

$$\partial S^1(0, v)/\partial u = k(v)\partial S^0(1,v)/\partial u + h(v)\partial S^1(0,v)/\partial v \qquad (10)$$

where $k(v)$ and $h(v)$ can be any scaler functions. Here, they are functions as follows.

$$k(v)=(1-v)k_0+vk_1$$

$$h(v)=(1-v)h_0+vh_1$$

where k0 and k1 are positive real values, and h0 and h1 are any real values.

Equation (10) means that in order for the two surfaces to be joined with $G^1$ continuity, the three derivative vectors, $S_u^0(1,v)$, $S_u^1(0,v)$, and $S_v^1(0,v)$, along the boundary curve should lie in the same plane, and, thus, one of those three vectors should be represented by the sum of the other two.

In joining a general boundary Gregory patch with a Gregory patch, a rational boundary Gregory patch, or a general boundary Gregory patch with the equation above being satisfied, there can be three different methods to be used. The present invention classifies the common boundary curve into three types as follows, and generates smooth joined surfaces by classifying the methods of joining surfaces accordingly.

Case 1: In the case that the boundary curve is a Bezier curve, the interior control points are generated by using the algorithm for interpolating a Gregory patch.

Case 2: In the case that the boundary curve is a rational Bezier curve, the interior control points are generated by using the algorithm for interpolating a rational boundary Gregory patch.

Case 3: In the case that the boundary curve is a composite curve, the interior control points are calculated by obtaining an imaginary polynomial curve from the derivative vectors at the end points of the composite curve and by using the algorithm for interpolating a Gregory patch. A detailed description of the last case is provided below.

Figure 7:
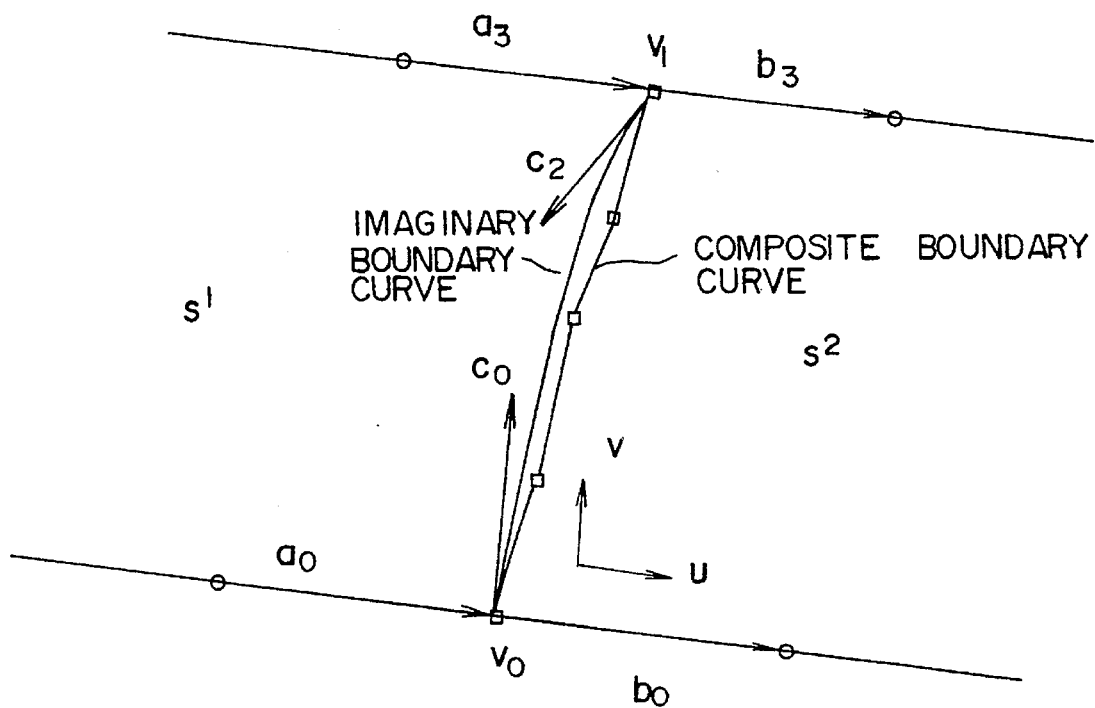
FIG. 7 is a diagram showing the joining of two general boundary Gregory patch according to the present invention when the boundary curve is a composite curve.

FIG. 7 shows the smooth joining of two general boundary Gregory patches, $S^1$ and $S^2$. Here, the common boundary curve is a composite curve comprised of four curve elements. Referring back to the term including $h(v)$ in equation (10), this term represents the derivative vectors of the boundary curve, and should be represented by a piecewise polynomial in the case of a composite boundary curve. Since the boundary curve and the derivative vectors of the boundary curve are represented independently in the general boundary Gregory patch, the derivative vector functions of u and v at the boundary should be represented by $S^c$. However, $S^c$ is assumed to be the Gregory patch or the rational boundary Gregory patch in this case, $S^c$ cannot represent the piecewise polynomial. Thus, $h(v)$ should be assumed to be zero.

Figure 8:
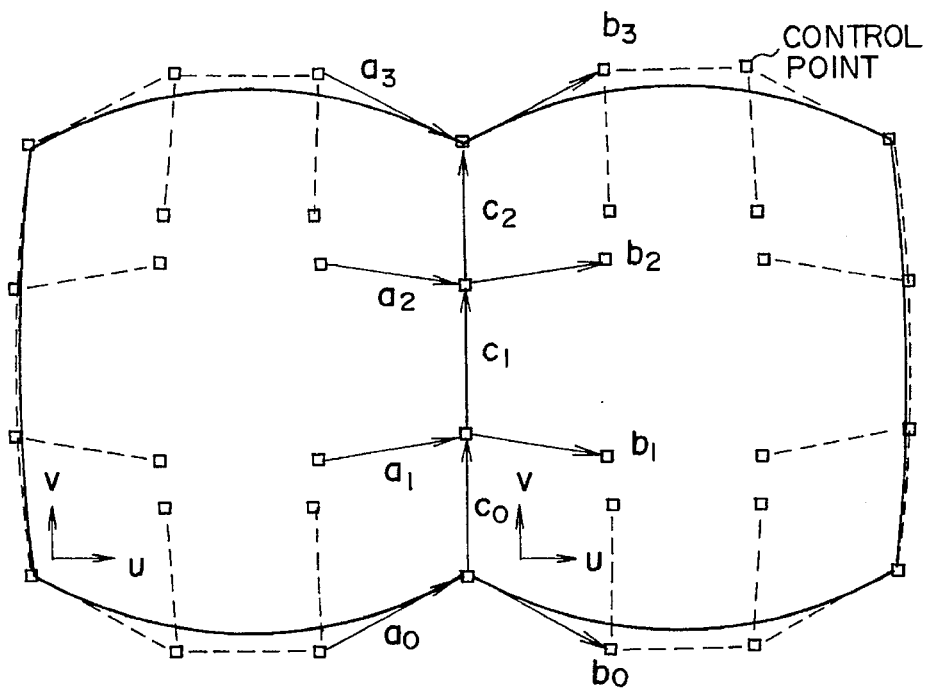
FIG. 8 is a diagram showing vectors based on the control points when joining two general boundary Gregory patches of FIG. 7 according to the present invention.

In order to have the condition of control points which has to be satisfied when two surfaces are to be joined with $G^1$ continuity, equation (10) can be expressed as follows for polynomial CBDs.

$$\sum_{i=0}^{3} B_i^3(v)b_i = k(v) \sum_{i=0}^{3} B_i^3(v)a_i + h(v) \sum_{i=0}^{2} B_i^2(v)c_i \qquad (11)$$

where vector ai, bi, and ci are based on the control points of the two patches, as shown in FIG. 8. In the case of a composite boundary curve, $h(v)$ should be set to zero.

$$\sum_{i=0}^{3} B_i^3(v)b_i = k(v) \sum_{i=0}^{3} B_i^3(v)a_i \qquad (12)$$

Figure 9:
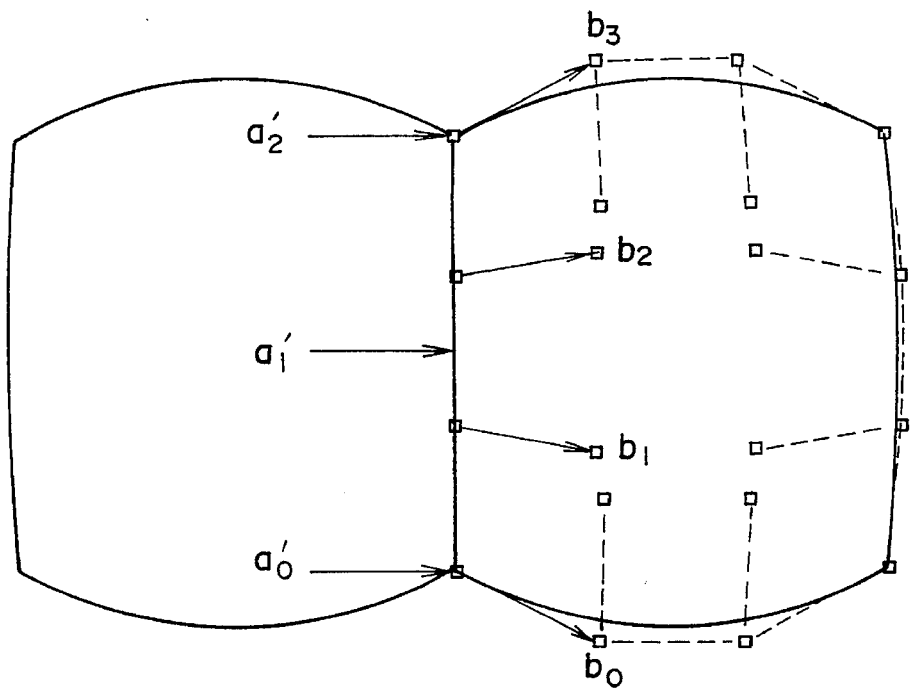
FIG. 9 is a diagram showing vectors used for the Basis Patch method when joining two general boundary Gregory patches of FIG. 7 according to the present invention.

In order to solve equation (12), the Basis Patch method is used, and equation (12) is revised to $$\sum_{i=0}^{3} B_i^3(v)b_i = k(v) \sum_{i=0}^{3} B_i^2(v)a_i' \qquad (13)$$

where vectors $a'_i$ (i=0,1,2) are shown in FIG. 9, and are calculated as follows.

$$a'_0=(a_0+b_0)/|a_0+b_0|$$

$$a'_2=(a_3+b_3)/|a_3+b_3|$$

$$a'_1=(a'_0+a'_2)/2$$

As seen in equation (13), only CBDs are necessary for the joining of two general boundary Gregory patches. Accordingly, only the control points of surface $S^c$ should be determined in this case. In FIG. 7, the vectors one third the length of the tangent vectors of the curves connected to end point $v_0$ and $v_1$ of the boundary curve are $a_0$, $a_3$, $b_0$, $b_3$, $c_0$, and $c_2$. From vector $b_0$, $b_3$, $c_0$, and $c_2$ and the end points of the boundary curve, the control points, $P_{00}^d$, $P_{01}^d$, $P_{02}^d$, $P_{03}^d$, $P_{10}^d$, $P_{13}^d$, can be obtained. Here, $$b_i=P_{1i1}^d-P_{0i1}^d \quad (i=0,1,2,3)$$

$$c_i=P_{0,i+1,1}^d-P_{0,i,1}^d \quad (i=0,1,2)$$

Thus, unknown variables at this point are k0, k1, $P_{111}^d$, and $P_{121}^d$. k0 and k1 can be obtained from relations between the vectors at end point $v_0$ and $v_1$ of the boundary curve, and $P_{111}^d$ and $P_{121}^d$ can be calculated by the following equation.

$$P_{111}^d=P_{01}^d+2k_0a'_1/3+k_1a'_0/3 \qquad (13)$$

$$P_{121}^d=P_{02}^d+k_0a'_2/3+2k_1a'_1/3 \qquad (14)$$

These are the same equations as those which appear in the case of joining two Gregory patches when $h(v)$ is set to zero.

Accordingly, the joining of two general boundary Gregory patches becomes equivalent to the joining of two Gregory patches.

A method of smoothly joining two surfaces has been described above, and, then, a method of interpolating curve mesh including the Bezier curve, the rational Bezier curve, and/or the composite curve is described below.

1. Definition of CBD

In order to generate a smooth surface, one from the two types of algorithms should be chosen and used according to the type of the boundary curve. When the boundary curve is a Bezier curve or a composite curve, the algorithm of joining Gregory patches should be used. When the boundary curve is a rational Bezier curve, the algorithm of joining rational boundary Gregory patches should be used. When the algorithm of joining rational boundary Gregory patches is used, surface $S^c$ of the general boundary Gregory patch becomes a rational function.

Figure 10:
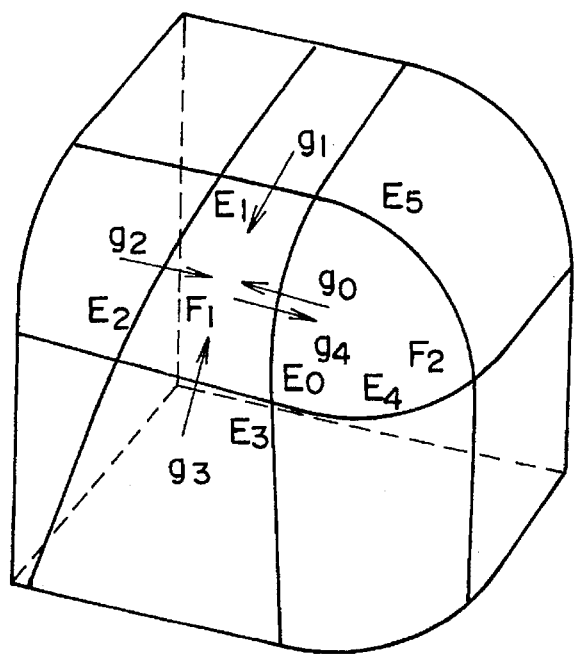
FIG. 10 is an illustrative drawing for explaining a method of setting cross boundary derivatives according to the present invention.

The process of defining CBD from the boundary curve is as follows. FIG. 10 shows face $F_1$ bounded by edge $E_i$(i=0, ..., 3). In order to interpolate the face, the cross boundary derivative function (CBD) across each edge is defined first. CBD $g_0(t)$ is defined from edge $E_1$ and $E_3$ only. However, if the tangent vectors of $E_0$, $E_1$, and $E_5$ at one end point of edge $E_0$ and the tangent vectors of $E_0$, $E_3$, and $E_4$ at the other end point of edge $E_0$, all of which are connected to the end points of edge $E_0$, satisfy equation (11), CBD $g_0(t)$ is defined by all of those edges. This means that if two faces $F_1$ and $F_2$ are to be joined together with $G^1$ continuity on the boundary edge $E_0$, there should be a relation of CBD $g_0(t) = -g_4(t)$. Other CBD $g_i(t)$ (i=1, ..., 3) can be defined in the same manner.

2. Determination of control points

From CBD which is dependent on the type of the boundary curve, control points are determined by using the algorithm of joining Gregory patches or joining rational boundary Gregory patches.

3. Setting of surface $S^c$ $S^c$ is set to a rational function, if there is at least one rational function in the boundary curves of the face to be interpolated. $S^c$ is set to a polynomial, if there are no rational functions. After the type of $S^c$ is determined, the control points derived from each CBD are created on $S^c$. If the number of CBD is four, the process is finished.

4. Division of non-quadrilateral face

Figure 11:
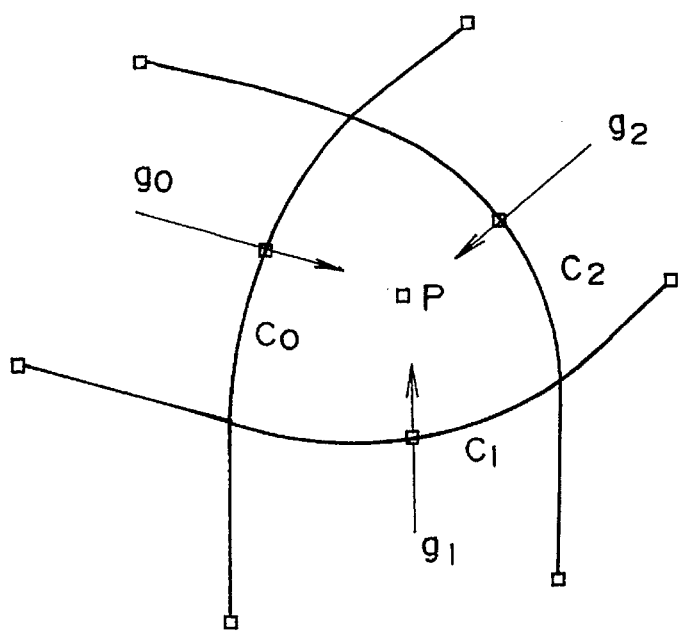
FIG. 11 is an illustrative drawing for explaining the interpolation of a non-quadrilateral face according to the present invention.
Figure 12:
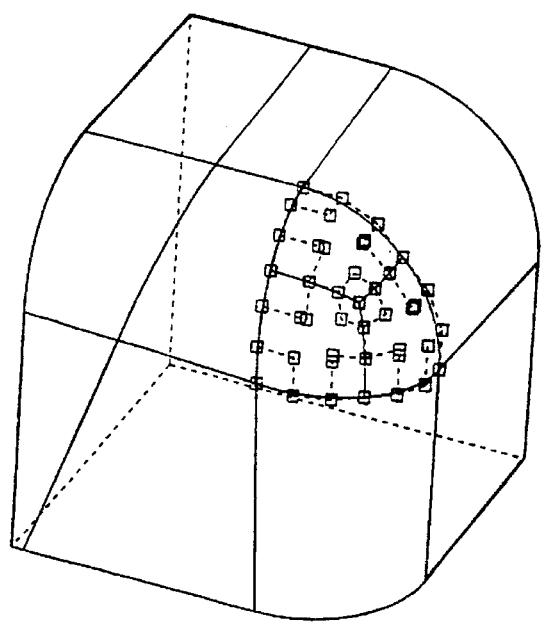
FIG. 12 is a diagram showing the interpolation of irregular curve mesh according to the present invention.

If the number of CBD is not four, the face is not quadrilateral and should be divided. The algorithm of dividing the face is as follows. In the case of a non-quadrilateral face like the face shown in FIG. 11, the face is divided into a plurality of quadrilateral faces by using CBD $g_i(t)$ of each boundary. Then, a general boundary Gregory patch is generated for each face created, as shown in FIG. 12. Referring back to FIG. 11, each step of generating interior curves is as follows.

(a) Obtain end point P of interior curves from boundary curve $C_i(t_0)$ (i=0,1,2) and CBD $g_i(t_0)$ along the boundary curves. For this, $t_0$ is set to 0.5.

(b) Generate quadratic Bezier curves from P, $C_i(t_0)$, and $g_i(t_0)$.

(c) Generate interior curves by raising the order from quadratic Bezier curves to cubic Bezier curves.

5. Setting of control points

Interior control points are generated in the faces divided by the interior curves. Each step is the same as 1 to 3 described above.

With the process described above, curve mesh can be interpolated by a general boundary Gregory patch.

An example of interpolation of a general boundary Gregory patch into curve mesh is described below.

Figure 13:
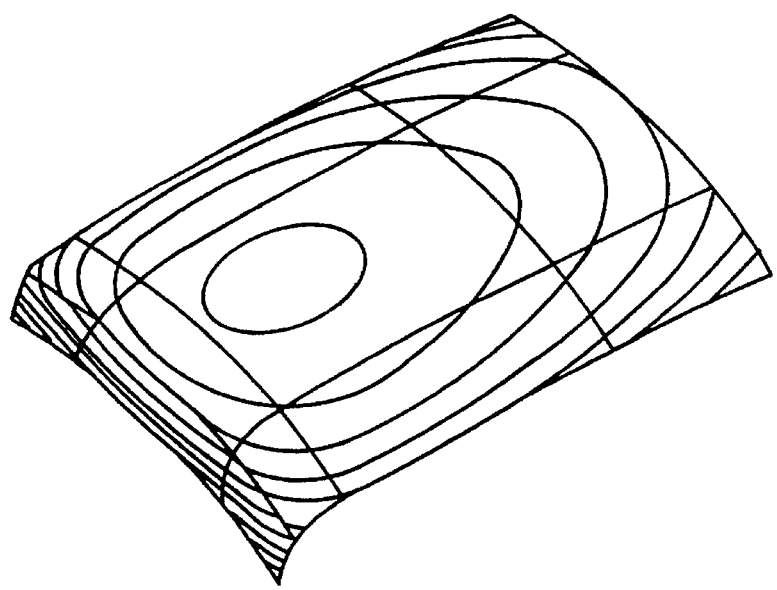
FIG. 13 is an exemplary illustration of the interpolation of curve mesh by Gregory patches according to the present invention.
Figure 14:
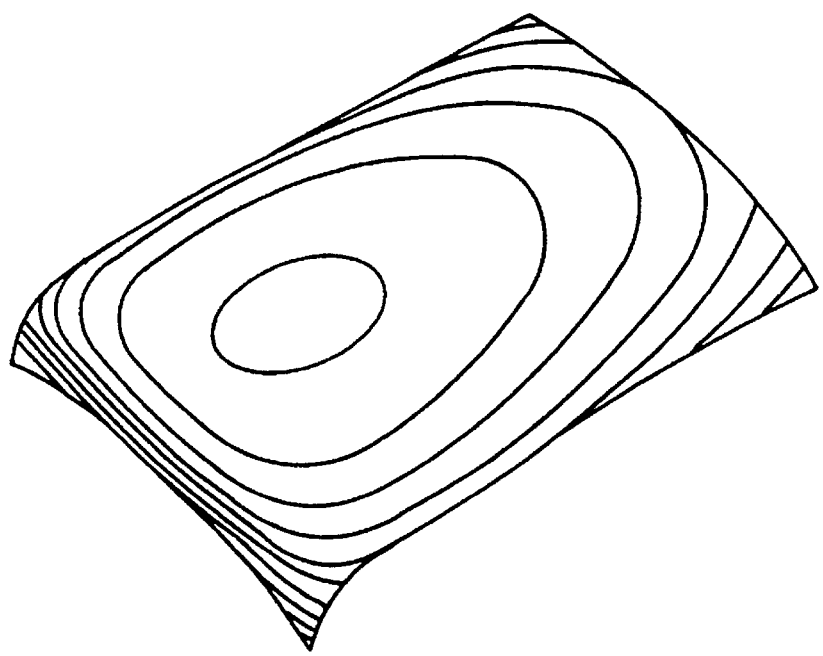
FIG. 14 is an exemplary illustration of the interpolation of curve mesh by a single large general boundary Gregory patch.
Figure 15:
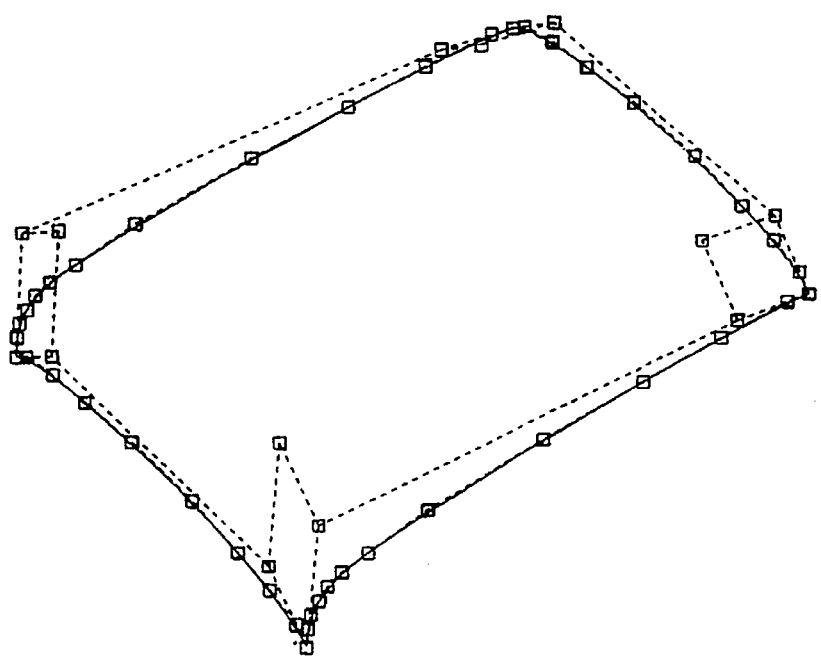
FIG. 15 is a diagram showing control points of a general boundary Gregory patch according to the present invention.

FIG. 13 shows contour lines when curve mesh is interpolated by Gregory patches. FIG. 14 shows contour lines when the interior boundary curves are removed, and a general boundary Gregory patch interpolates the curve mesh whose boundary curves are represented by the NURBS curve. As seen in FIG. 13 and FIG. 14, a surface can be represented by fewer boundary curves by using the general boundary Gregory patch. FIG. 15 shows the control points of the interpolated general boundary Gregory patch.

Figure 16:
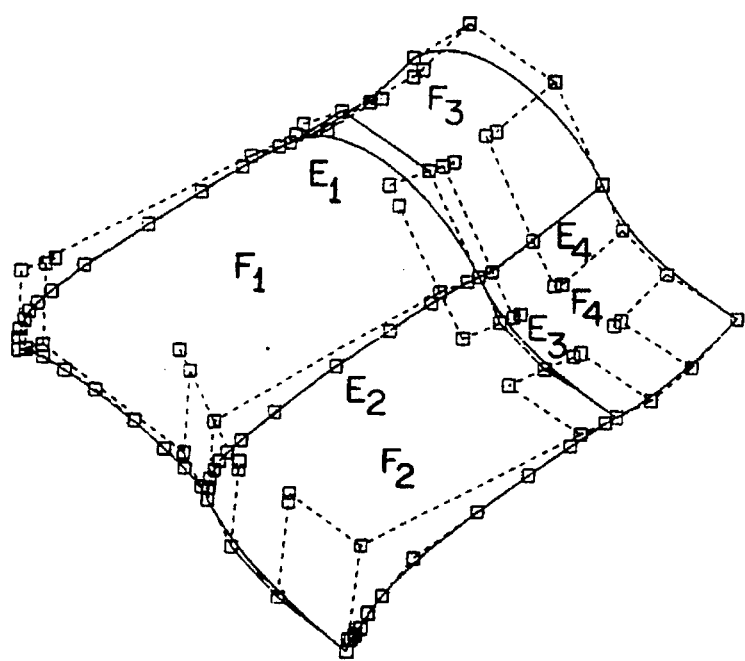
FIG. 16 is a diagram showing the joining of the general boundary Gregory patch, the rational boundary Gregory patch, and the Gregory patch according to the present invention.

FIG. 16 shows curve mesh in which the general boundary Gregory patch, the Gregory patch, and the rational boundary Gregory patch are joined together. Edge $E_1$ is a quadratic rational Bezier curve, $E_2$ is a non-rational B-spline curve, $E_3$ and $E_4$ are Bezier curves. Thus, face $F_1$ is interpolated by a general boundary Gregory patch whose $S^c$ is a rational function, and $F_2$ a general boundary Gregory patch whose $S^c$ is a polynomial. And, face $F_3$ is interpolated by a Gregory patch, and face $F_4$ a rational boundary Gregory patch.

Figure 17:
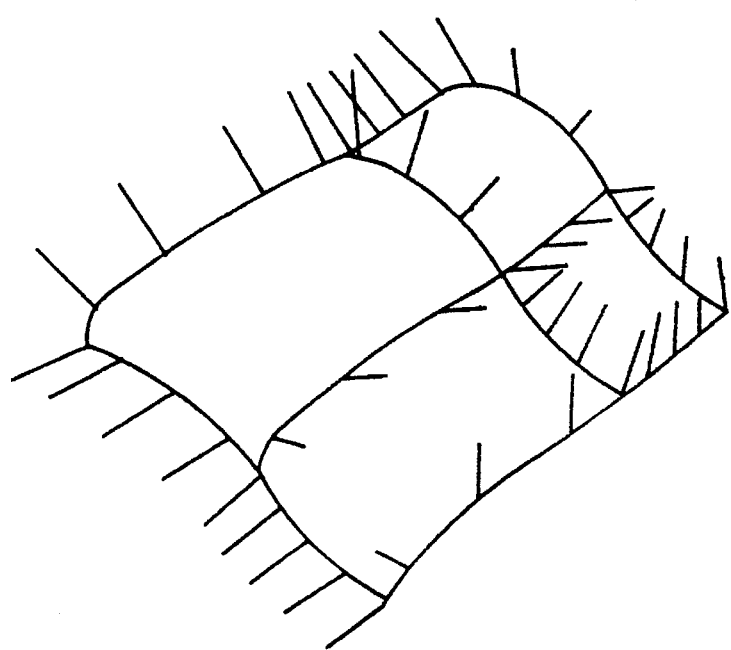
FIG. 17 is a diagram showing the normal vector representation of the two general boundary Gregory patches, the Gregory patch, and the rational boundary Gregory patch in FIG. 16 according to the present invention.
Figure 18:
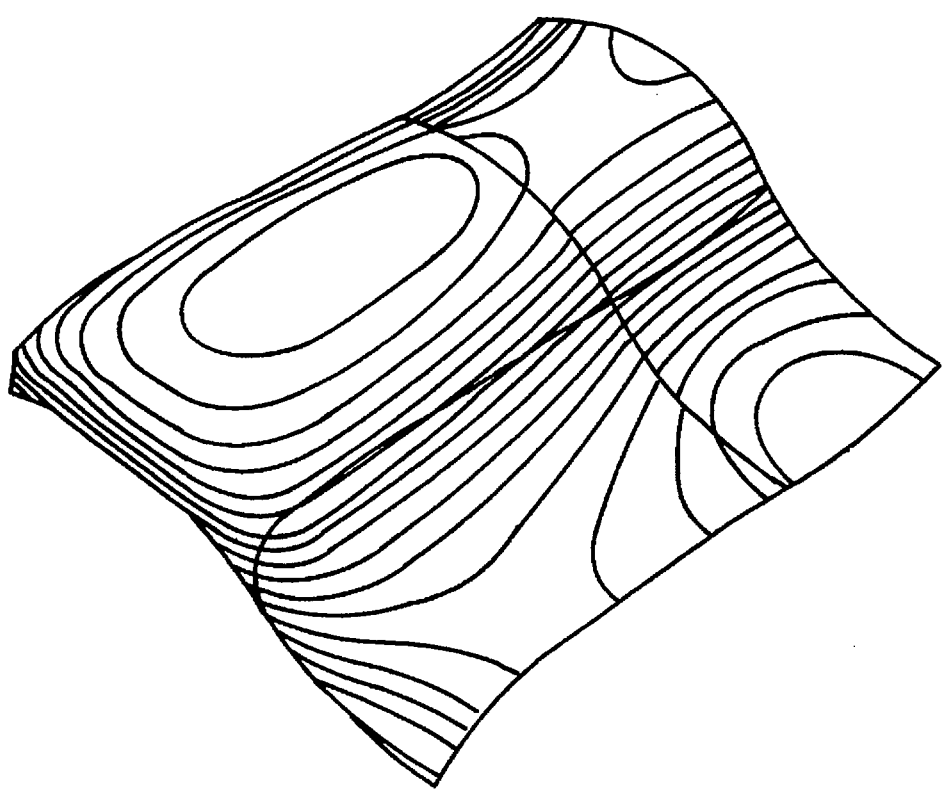
FIG. 18 is an exemplary illustration of contour lines of a general boundary Gregory patch according to the present invention.

The control points of those patches are shown in FIG. 16 also. The normal vectors of each patch on the boundaries are shown in FIG. 17. Since the normal vectors on the same boundary curve are corresponding, it can be seen that those patches are joined smoothly. FIG. 18 shows contour lines of the surfaces of FIG. 17.

Figure 19:
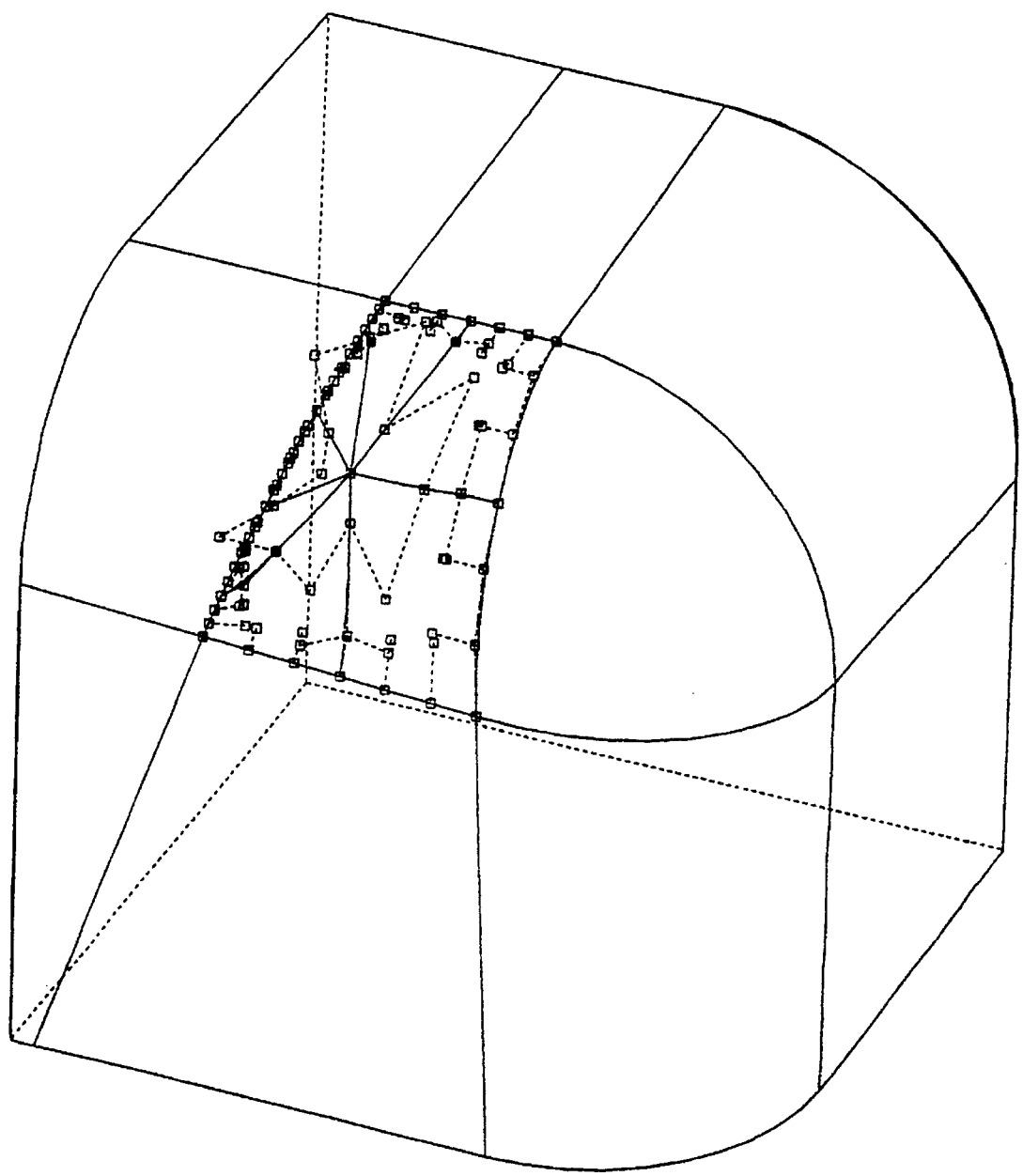
FIG. 19 is an illustrative drawing for explaining the interpolation of irregular curve mesh including composite curves with a Gregory.
Figure 20:
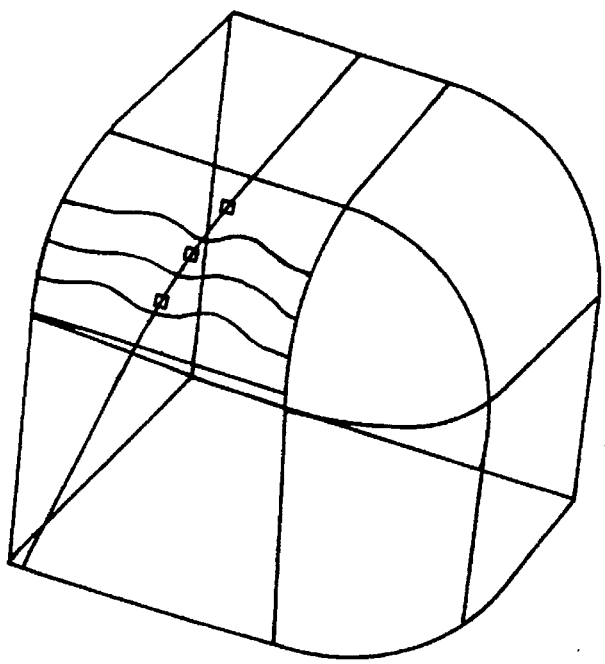
FIG. 20 is an exemplary illustration of contour lines of interpolated Gregory patches having distortion.
Figure 21:
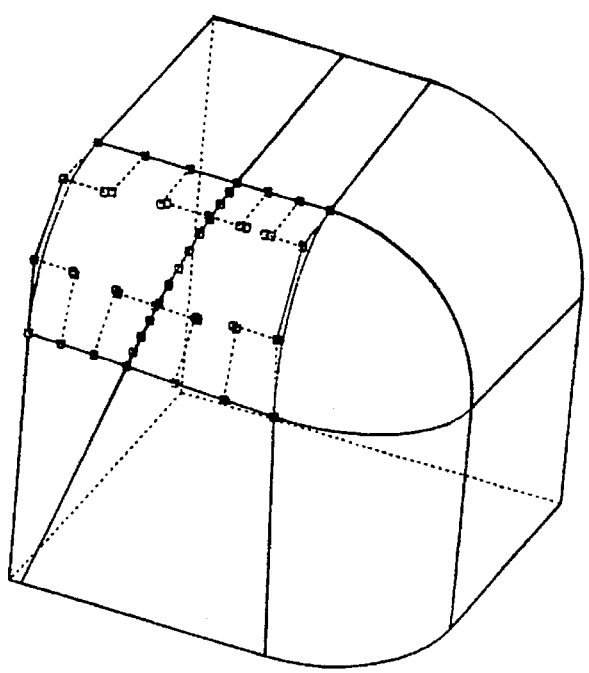
FIG. 21 is a diagram showing control points of a general boundary Gregory patch according to the present invention.
Figure 22:
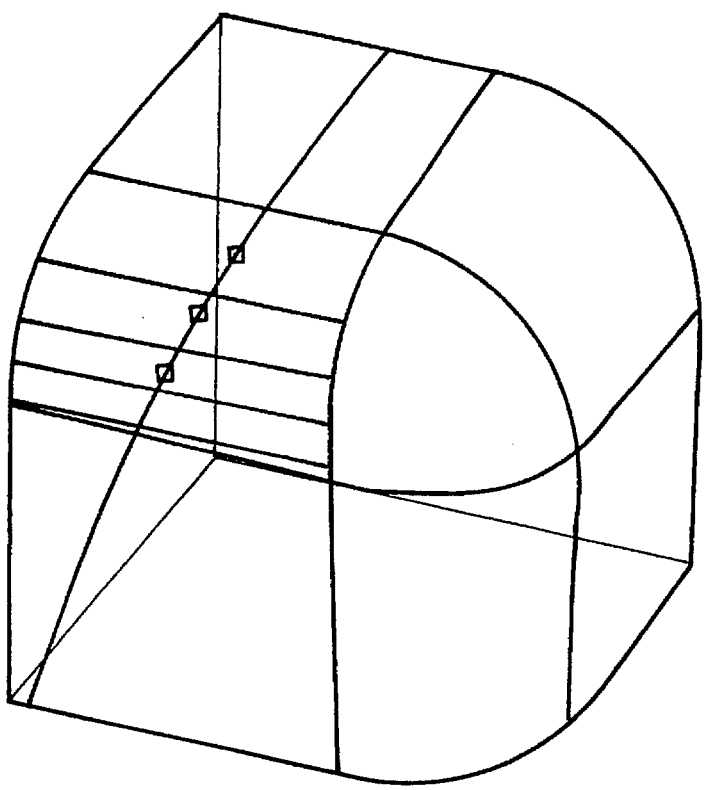
FIG. 22 is an exemplary illustration of contour lines of a general boundary Gregory patch according to the present invention.

FIG. 20 shows contour lines when the curve mesh shown in FIG. 19 is interpolated by Gregory patches. FIG. 21 and FIG. 22 show control points and contour lines, respectively, when the curve mesh shown in FIG. 19 is interpolated by general boundary Gregory patches. When Gregory patches are used, the surface has some distortion. When general boundary Gregory patches are used, however, this distortion disappears.

Interpolation of curve mesh by the general boundary Gregory patch has the following advantages.

1. Being able to design complex free-form surfaces with simple curve mesh since composite curves can be used.

2. Generating a single surface for a quadrilateral face without creating interior curves and, thus, without creating any distortion even if there is a composite curve comprising the face.

3. Keeping $C^n$ continuity within the surface.

4. Defining boundary curves and CBD independently.

5. Being able to handle boundaries of off-set surfaces and to handle surfaces created by intersection curves between surfaces.

6. Being able to be smoothly joined to an adjacent Gregory patch, rational boundary Gregory patch, and general boundary Gregory patch.

7. Providing a way of intuitively manipulating a shape since the formation of the shape is based on the control points.

By the use of the general boundary Gregory patch, free-form surfaces more complex than before can be designed with simple curve mesh, and the general boundary Gregory patch can be joined with Gregory patches and rational boundary Gregory patches. Thus, the general boundary Gregory patch can be a useful tool for designing surfaces.

What is claimed is:

1. A free-form surface generation method for smoothly joining two adjacent free-form surfaces when said two adjacent free-form surfaces share a composite curve as a boundary in a three-dimensional (3 D) computer-aided design (CAD) system to generate a three-dimensional shape based on curve mesh, said free-form surface generation method comprising the steps of:

(a) determining continuity conditions on said composite curve as to whether or not said composite curve is non-rational based upon said composite curve and curves connected to said composite curve;

(b) determining connection conditions on said composite curve as to whether or not said composite curve is non-polynomial if said continuity conditions indicate that said composite curve is non-rational;

(c) generating an imaginary curve approximating said composite curve with a polynomial if said connection conditions indicate that said composite curve is non-polynomial;

(d) generating interior control points of said two adjacent free-from surfaces with respect to said imaginary curve by using said connection conditions; and (e) using said interior control points to allow processing of said three-dimensional shape with consistency of surface continuity in CAD applications.

2. The free-form surface generation method as claimed in claim 1, further comprising the step of generating a smooth free-form surface by creating said interior control points with regard to all boundary curves and by combining said interior control points.

3. The free-form surface generation method as claimed in claim 2, further generating said smooth free-form surface joined smoothly to adjacent Gregory patches which are defined by polynomial functions to parametrically represent free-form surfaces.

4. The free-form surface generation method as claimed in claim 2, further generating said smooth free-form surface joined smoothly to adjacent rational boundary Gregory patches which are defined by rational functions to parametrically represents free-form surfaces.

5. The free-form surface generation method as claimed in claim 2, further comprising the step of combining a plurality of curves of curve mesh representing a shape so as to allow fewer curves to represent said shape.

6. The free-form surface generation method as claimed in claim 2, further interpolating only one surface into one face of curve mesh.

7. The free-form surface generation method as claimed in claim 4, further keeping $C^n$ continuity within said smooth free-form surface.

8. An apparatus for generating surfaces, said apparatus comprising:

receiving means for receiving curve mesh data representing curve mesh;

processing means for processing said curve mesh data to generate surfaces;

memory means for storing said surfaces; and reference means for retrieving said surfaces from said memory means so that CAD applications can use said surfaces with consistency of surface continuity, wherein said processing means joins smoothly two adjacent free-form surfaces when said two adjacent free-form surfaces share a composite curve as a boundary curve to generate a three-dimensional shape based on curve mesh and comprises:

continuity condition identifying means for determining continuity conditions that said composite curve is non-rational by using said composite curve and curves connected to said composite curve;

connection condition calculation means in response to said continuity condition identifying means for determining connection conditions that said composite curve is non-polynomial by using said continuity conditions;

imaginary curve generation means in response to said connection calculation means for generating an imaginary curve approximating said composite curve with a polynomial; and interior control point generation means for generating interior control points of said two adjacent free-form surfaces with regard to said composite curve by using said connection conditions.

9. The apparatus as claimed in claim 8, further comprising surface generating means for generating a smooth free-form surface by creating said interior control points with regard to all boundary curves and by combining said interior control points.

10. The apparatus as claimed in claim 9, further generating said smooth free-form surface joined smoothly to adjacent Gregory patches which are defined by polynomial functions to parametrically represent free-form surfaces.

11. The apparatus as claimed in claim 9, further generating said smooth free-form surface joined smoothly to adjacent rational boundary Gregory patches which are defined by rational functions to parametrically represents free-form surfaces.

12. The apparatus as claimed in claim 9, further comprising combining means for combining a plurality of curves of said curve mesh representing a shape so as to allow fewer curves to represent said shape.

13. The apparatus as claimed in claim 9, further interpolating only one surface into one face of said curve mesh.

14. The apparatus as claimed in claim 11, further keeping $C^n$ continuity within said smooth free-form surface.

* * * * *

UNITED STATES PATENT AND TRADEMARK OFFICE
CERTIFICATE OF CORRECTION

PATENT NO. : 5,619,625
DATED : April 8, 1997
INVENTOR(S) : Kouichi Konno and Hiroaki Chiyokura It is certified that error appears in the above-indentified patent and that said Letters Patent is hereby corrected as shown below:

Column 1, line 22, change "straight forward" to --straightforward--.

Signed and Sealed this

Fifteenth Day of July, 1997

*Attest:*

BRUCE LEHMAN

*Attesting Officer*    *Commissioner of Patents and Trademarks*